United States Patent
McDufford

(10) Patent No.: US 10,287,895 B2
(45) Date of Patent: May 14, 2019

(54) MIDSPAN SHROUDED TURBINE ROTOR BLADES

(71) Applicant: General Electric Company, Schenectady, NY (US)

(72) Inventor: Michael David McDufford, Greenville, SC (US)

(73) Assignee: General Electric Company, Schenectady, NY (US)

( * ) Notice: Subject to any disclaimer, the term of this patent is extended or adjusted under 35 U.S.C. 154(b) by 405 days.

(21) Appl. No.: 14/979,802

(22) Filed: Dec. 28, 2015

(65) Prior Publication Data

US 2017/0183972 A1 Jun. 29, 2017

(51) Int. Cl.
| | |
|---|---|
| *F01D 5/22* | (2006.01) |
| *F01D 5/14* | (2006.01) |
| *F01D 5/16* | (2006.01) |

(52) U.S. Cl.
CPC ............ *F01D 5/225* (2013.01); *F01D 5/141* (2013.01); *F01D 5/147* (2013.01); *F01D 5/16* (2013.01); *F01D 5/22* (2013.01); *F05D 2220/32* (2013.01); *F05D 2230/10* (2013.01); *F05D 2230/60* (2013.01); *Y02T 50/671* (2013.01); *Y02T 50/673* (2013.01)

(58) Field of Classification Search
CPC ..................................................... F01D 5/225
USPC ................................................ 416/189, 190
See application file for complete search history.

(56) References Cited

U.S. PATENT DOCUMENTS

| | | | |
|---|---|---|---|
| 2,772,854 A | | 12/1956 | Anxionnaz |
| 4,257,741 A | * | 3/1981 | Betts ........................ B22F 7/064 |
| | | | 228/122.1 |
| 6,568,908 B2 | | 5/2003 | Namura et al. |
| 8,182,228 B2 | * | 5/2012 | Riley ...................... B23P 6/005 |
| | | | 29/889.7 |

(Continued)

FOREIGN PATENT DOCUMENTS

| | | |
|---|---|---|
| EP | 0 036 044 A1 | 9/1981 |
| WO | 2011/081768 A2 | 7/2011 |

OTHER PUBLICATIONS

Extended European Search Report and Opinion issued in connection with corresponding EP Application No. 16203626.3 dated Apr. 18, 2017.

*Primary Examiner* — Woody A Lee, Jr.
*Assistant Examiner* — Jason A Fountain
(74) *Attorney, Agent, or Firm* — Mark E. Henderson; Ernest G. Cusick; Frank A. Landgraff

(57) ABSTRACT

A rotor blade for a gas turbine configured for use within a row of samely configured rotor blades. The rotor blade may further include: an airfoil defined between pressure and suction faces; and a midspan shroud comprising a pressure wing and a suction wing extending from the airfoil. The pressure wing and the suction wing of the midspan shroud may be configured so to cooperatively form an interface between installed neighboring ones of the rotor blades within the row of samely configured rotor blades. One of the pressure wing and the suction wing may be designated a first wing, and the first wing may include a chamber hollowed through a first surface of the first wing. The first surface of the first wing may include one of: a circumferential face formed at a distal end of the first wing; and a contact face of the first wing.

7 Claims, 14 Drawing Sheets

(56) References Cited

U.S. PATENT DOCUMENTS

| | | | | |
|---|---|---|---|---|
| 8,684,692 B2* | 4/2014 | Mayer | ............... | F01D 5/187 |
| | | | | 415/115 |
| 8,790,082 B2* | 7/2014 | Merrill | ............... | B22C 9/04 |
| | | | | 416/96 R |
| 9,328,619 B2* | 5/2016 | Chouhan | ............... | F01D 5/22 |
| 9,435,212 B2* | 9/2016 | Scribner | ............ | F01D 5/188 |
| 2011/0194939 A1 | 8/2011 | Marra | | |
| 2014/0119923 A1 | 5/2014 | Chouhan | | |
| 2017/0183971 A1 | 6/2017 | McDufford et al. | | |
| 2017/0183973 A1 | 6/2017 | McDufford et al. | | |
| 2017/0183974 A1 | 6/2017 | McDufford | | |

* cited by examiner

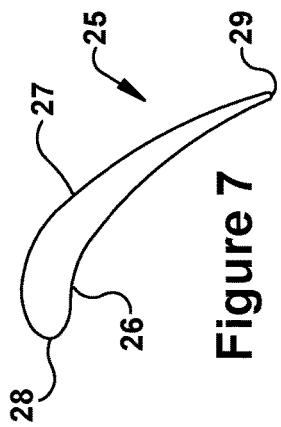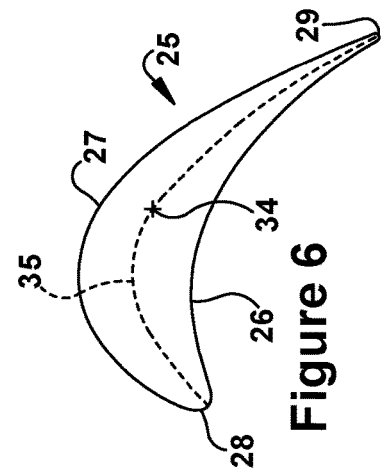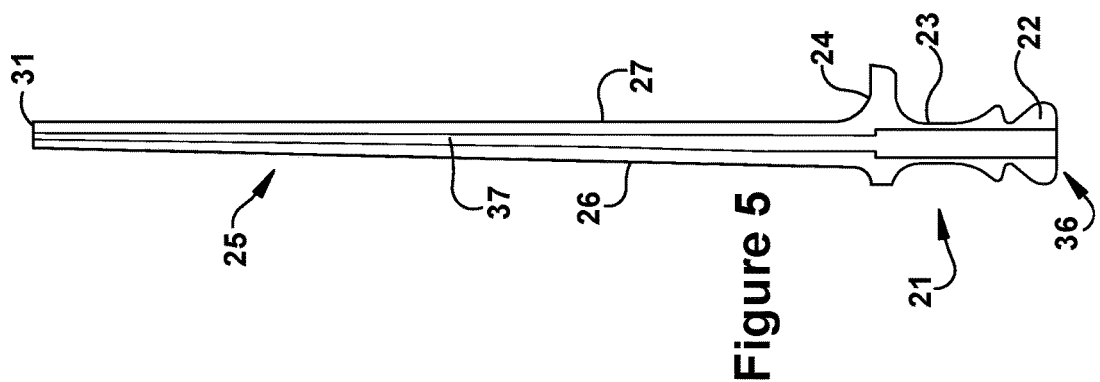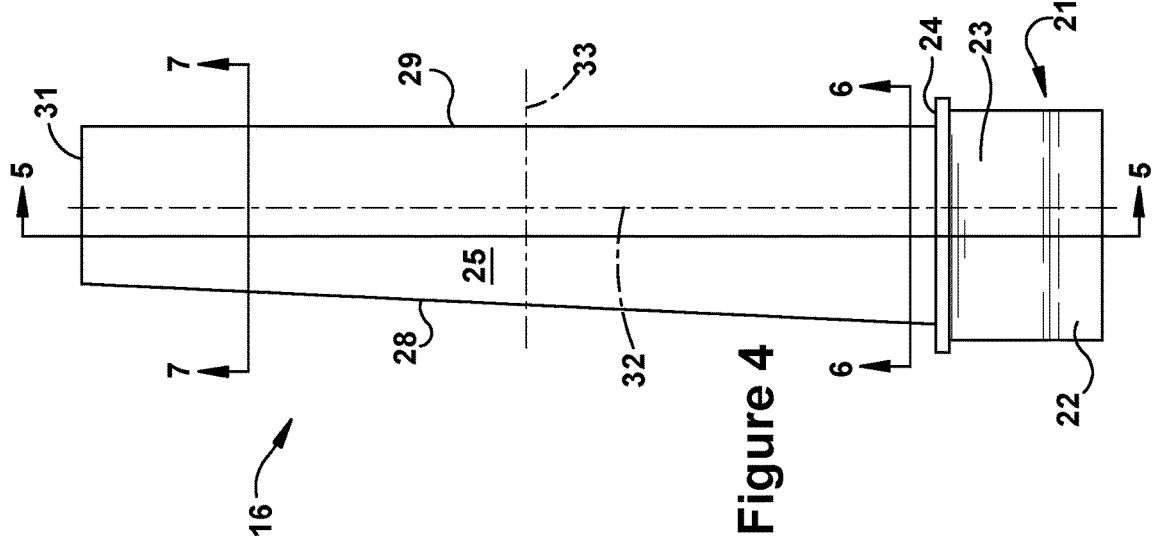

MIDSPAN SHROUDED TURBINE ROTOR BLADES

BACKGROUND OF THE INVENTION

The present application relates generally to apparatus, methods and/or systems concerning the design, manufacture, and use of rotor blades in combustion or gas turbine engines. More specifically, but not by way of limitation, the present application relates to apparatus and assemblies pertaining to turbine rotor blades having midspan shrouds.

In combustion or gas turbine engines (hereinafter "gas turbines"), it is well known that air pressurized in a compressor is used to combust fuel in a combustor to generate a flow of hot combustion gases, whereupon the gases flow downstream through one or more turbines so that energy can be extracted therefrom. In accordance with such engines, generally, rows of circumferentially spaced rotor blades extend radially outwardly from a supporting rotor disc. Each rotor blade typically includes a dovetail that permits assembly and disassembly of the blade in a corresponding dovetail slot in the rotor disc, as well as an airfoil that extends radially outwardly from the dovetail and interacts with the flow of the working fluid through the engine. The airfoil has a concave pressure side and convex suction side extending axially between corresponding leading and trailing edges, and radially between a root and a tip. It will be understood that the blade tip is spaced closely to a radially outer stationary surface for minimizing leakage therebetween of the combustion gases flowing downstream between the turbine blades.

Shrouds at the tip of the airfoil or "tip shrouds" often are implemented on aftward stages or rotor blades to provide a point of contact at the tip, manage bucket vibration frequencies, enable a damping source, and to reduce the over-tip leakage of the working fluid. Given the length of the rotor blades in the aftward stages, the damping function of the tip shrouds provides a significant benefit to durability. However, taking full advantage of the benefits is difficult considering the weight that the tip shroud adds to the assembly and the other design criteria, which include enduring thousands of hours of operation exposed to high temperatures and extreme mechanical loads. Thus, while large tip shrouds are desirable because of the effective manner in which they seal the gas path and the stable connections they form between neighboring rotor blades, it will be appreciated that such shrouds are troublesome because of the increased pull loads on the rotor blade, particularly at the base of the airfoil because it must support the entire load of blade.

One way to address this is to position the shroud lower on the airfoil. That is to say, instead of adding the shroud to the tip of the airfoil, the shroud is positioned near the middle radial region. As used herein, such shrouds will be referred to as a "midspan shrouds." At this lower (i.e., more inboard) radius, the mass of the shroud causes a reduced level of stress to the rotor blade. However, several issues related to the design and usage of conventional midspan shrouds have been identified by the present inventors. These include issues related to the mass of such midspan shrouds and the reduction of weight related thereto so to minimize resulting operational stresses to the airfoil. That is to say, to the extent weight may be reduced while still fulfilling structural requirements, the life of the rotor blade may be extended.

As will be appreciated, according to these and other criteria, the design of shrouded rotor blades includes many complex, often competing considerations. Novel designs that balance these in a manner that optimizes or enhances one or more desired performance criteria—while still adequately promoting structural robustness, part-life longevity, manufacturability, and/or cost-effective engine operation—represent economically valuable technology.

BRIEF DESCRIPTION OF THE INVENTION

The present application thus describes a rotor blade for a gas turbine configured for use within a row of samely configured rotor blades. The rotor blade may further include: an airfoil defined between a concave pressure face and a laterally opposed convex suction face; and a midspan shroud comprising a pressure wing extending from the pressure face of the airfoil and a suction wing extending from the suction face of the airfoil. The pressure wing and the suction wing of the midspan shroud may be configured so to cooperatively form an interface between installed neighboring ones of the rotor blades within the row of samely configured rotor blades. One of the pressure wing and the suction wing may be designated a first wing, and the first wing may include a chamber hollowed through a first surface of the first wing. The first surface of the first wing may include one of: a circumferential face formed at a distal end of the first wing; and a contact face of the first wing.

The present invention may further describe a method of manufacturing a rotor blade for use in a turbine of a gas turbine. The rotor blade may include: an airfoil defined between a concave pressure face and a laterally opposed convex suction face; and a midspan shroud comprising a pressure wing extending from the pressure face of the airfoil and a suction wing extending from the suction face of the airfoil. The method may include the steps of: selecting one of the pressure wing and the suction wing as a first wing; selecting a target internal region within the first wing for removal to form a hollow chamber, the internal region selected pursuant to a minimal bending load criteria; selecting a target surface on the first wing through which to form the chamber, the target surface comprising at least one of: a circumferential face formed at a distal end of the first wing; and a contact face of the first wing; and forming the chamber via a machining process through the target surface.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which:

FIG. 4 is a side view of an exemplary turbine rotor blade that includes an internal cooling configuration and structural arrangement according to possible aspects and embodiments of the present application;

FIG. 5 is a section view along sight line 5-5 of FIG. 4;

FIG. 6 is a section view along sight line 6-6 of FIG. 4;

FIG. 7 is a section view along sight line 7-7 of FIG. 4;

DETAILED DESCRIPTION OF THE INVENTION

Figure 1:
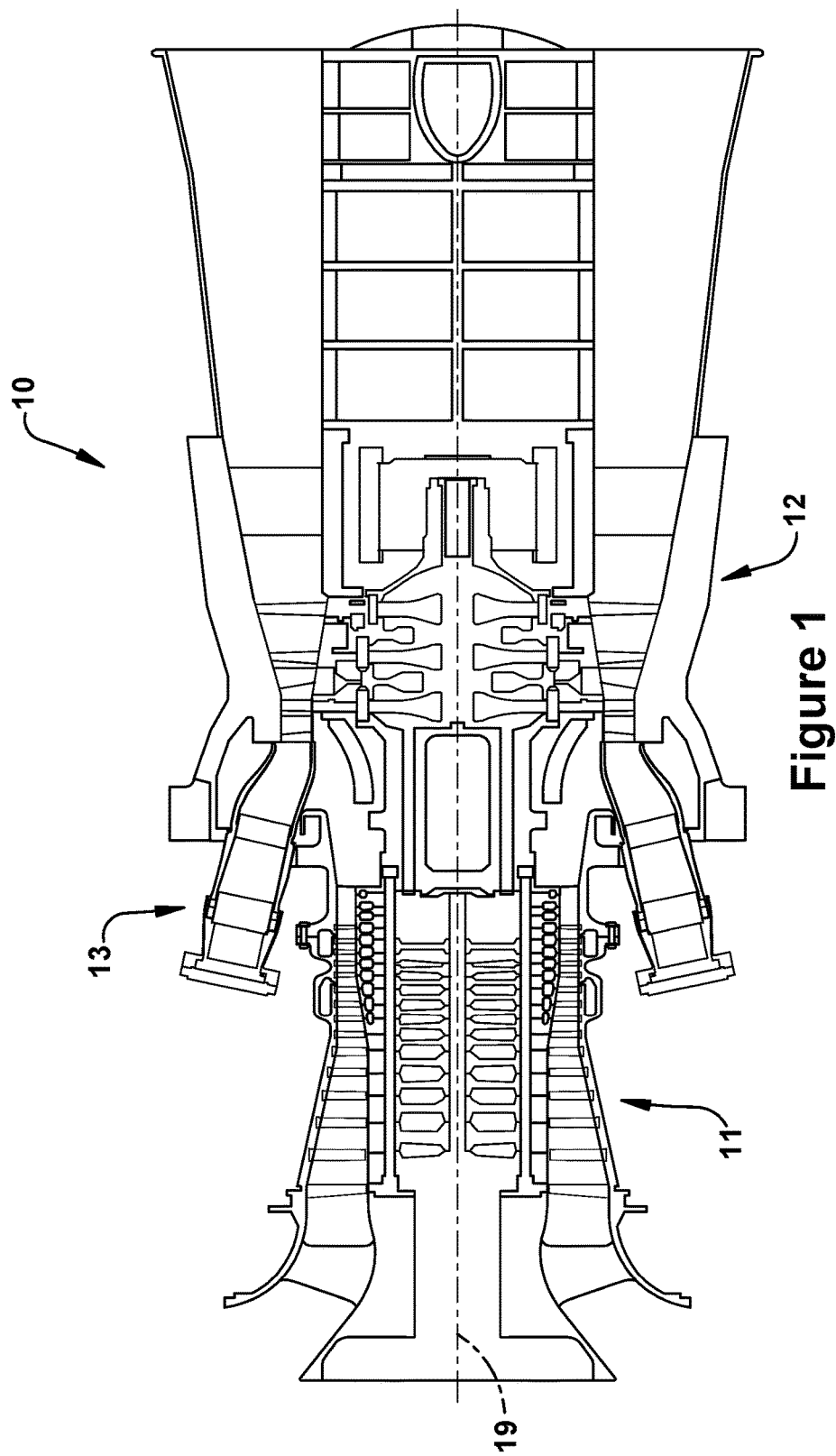
FIG. 1 is a schematic representation of an exemplary gas turbine that may include turbine blades according to possible aspects and embodiments of the present application.

Aspects and advantages of the present application are set forth below in the following description, or may be obvious from the description, or may be learned through practice of the invention. Reference will now be made in detail to present embodiments of the invention, one or more examples of which are illustrated in the accompanying drawings. The detailed description uses numerical designations to refer to features in the drawings. Like or similar designations in the drawings and description may be used to refer to like or similar parts of embodiments of the invention. As will be appreciated, each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. It is intended that the present invention covers such modifications and variations as come within the scope of the appended claims and their equivalents. It is to be understood that the ranges and limits mentioned herein include all sub-ranges located within the prescribed limits, inclusive of the limits themselves unless otherwise stated. Additionally, certain terms have been selected to describe the present invention and its component subsystems and parts. To the extent possible, these terms have been chosen based on the terminology common to the technology field. Still, it will be appreciate that such terms often are subject to differing interpretations. For example, what may be referred to herein as a single component, may be referenced elsewhere as consisting of multiple components, or, what may be referenced herein as including multiple components, may be referred to elsewhere as being a single component. In understanding the scope of the present invention, attention should not only be paid to the particular terminology used, but also to the accompanying description and context, as well as the structure, configuration, function, and/or usage of the component being referenced and described, including the manner in which the term relates to the several figures, as well as, of course, the precise usage of the terminology in the appended claims. Further, while the following examples are presented in relation to certain types of gas turbines or turbine engines, the technology of the present application also may be applicable to other categories of turbine engines, without limitation, as would the understood by a person of ordinary skill in the relevant technological arts. Accordingly, it should be understood that, unless otherwise stated, the usage herein of the term "gas turbine" is intended broadly and with limitation as the applicability of the present invention to the various types of turbine engines.

Given the nature of how gas turbines operate, several terms prove particularly useful in describing certain aspects of their function. These terms and their definitions, unless specifically stated otherwise, are as follows.

The terms "forward" and "aftward" refer to directions relative to the orientation of the gas turbine and, more specifically, the relative positioning of the compressor and turbine sections of the engine. Thus, as used therein, the term "forward" refers to the compressor end while "aftward" refers to the turbine end. It will be appreciated that each of these terms may be used to indicate direction of movement or relative position along the central axis of the engine.

The terms "downstream" and "upstream" are used herein to indicate position within a specified conduit or flowpath relative to the direction of flow (hereinafter "flow direction") moving through it. Thus, the term "downstream" refers to the direction in which a fluid is flowing through the specified conduit, while "upstream" refers to the direction opposite that. These terms may be construed as relating to what would be understood by one skilled in the art as the flow direction through the conduit given normal or anticipated operation. As will be appreciated, within the compressor and turbine sections of the gas turbine, the working fluid is directed through and contained within an annularly shaped working fluid flowpath that is defined about the central axis of the engine. In such cases, the term "flow direction" may refer to a reference direction representing an idealized expected direction of flow of working fluid through the working fluid flowpath of the engine. This reference direction may be understood as one that is parallel to the central axis of the gas turbine and oriented in the downstream or aftward direction.

Accordingly, for example, the flow of working fluid through the working fluid flowpath of the gas turbine may be described as beginning as air pressurized through the compressor in the expected flow direction, becoming combustion gases in the combustor upon being combusted with a fuel, and, finally, being expanded in the expected flow direction as it passed through the turbine. Alternatively, the flow of working fluid may be described as beginning at a forward or upstream location toward a forward or upstream end of the gas turbine, moving generally in a downstream or aftward direction, and, finally, terminating at an aftward or downstream location toward an aftward or downstream end of the gas turbine.

As many components of gas turbines rotate during operation, such as compressor and turbine rotor blades, the terms rotationally lead and rotationally trail may be used to delineate positioning of subcomponents or subregions relative to rotation within the engine. Thus, as will be appreciated, these terms may differentiate position per the direction of rotation (hereinafter "rotation direction") within the compressor or turbine. The rotation direction may be understood as being the expected direction of rotation for a component given normal or anticipated operation of the gas turbine.

In addition, given the configuration of the gas turbines, particularly the arrangement of the compressor and turbine sections about a common shaft or rotor, as well as the cylindrical configuration common to many combustor types, terms describing position relative to an axis may be regularly used herein. In this regard, it will be appreciated that the term "radial" refers to movement or position perpendicular to an axis. Related to this, it may be required to describe relative distance from the central axis. In such cases, for example, if a first component resides closer to the central axis than a second component, the first component will be described as being either "radially inward" or "inboard" of the second component. If, on the other hand, the first component resides further from the central axis, the first component will be described as being either "radially outward" or "outboard" of the second component. As used herein, the term "axial" refers to movement or position parallel to an axis, while the term "circumferential" refers to movement or position around an axis. Unless otherwise stated or contextually apparent, these terms describing position relative to an axis should be construed as relating to the central axis of the compressor and turbine sections of the engine as defined by the rotor extending through each. However, the terms also may be used relative to the longitudinal axis of certain components or subsystems within the gas turbine, such as, for example, the longitudinal axis around which conventional cylindrical or "can" combustors are typically arranged.

Finally, the term "rotor blade", without further specificity, is a reference to the rotating blades of either the compressor or the turbine, and so may include both compressor rotor blades and turbine rotor blades. The term "stator blade", without further specificity, is a reference to the stationary blades of either the compressor or the turbine and so may include both compressor stator blades and turbine stator blades. The term "blades" may be used to generally refer to either type of blade. Thus, without further specificity, the term "blades" is inclusive to all type of turbine engine blades, including compressor rotor blades, compressor stator blades, turbine rotor blades, turbine stator blades and the like.

Figure 2:
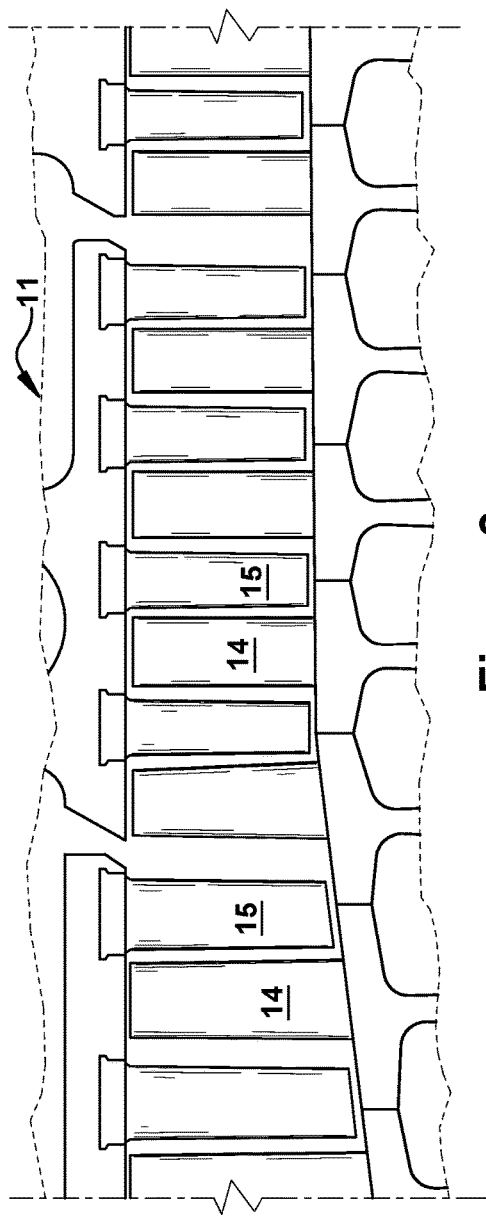
FIG. 2 is a sectional view of the compressor section of the gas turbine of FIG. 1.
Figure 3:
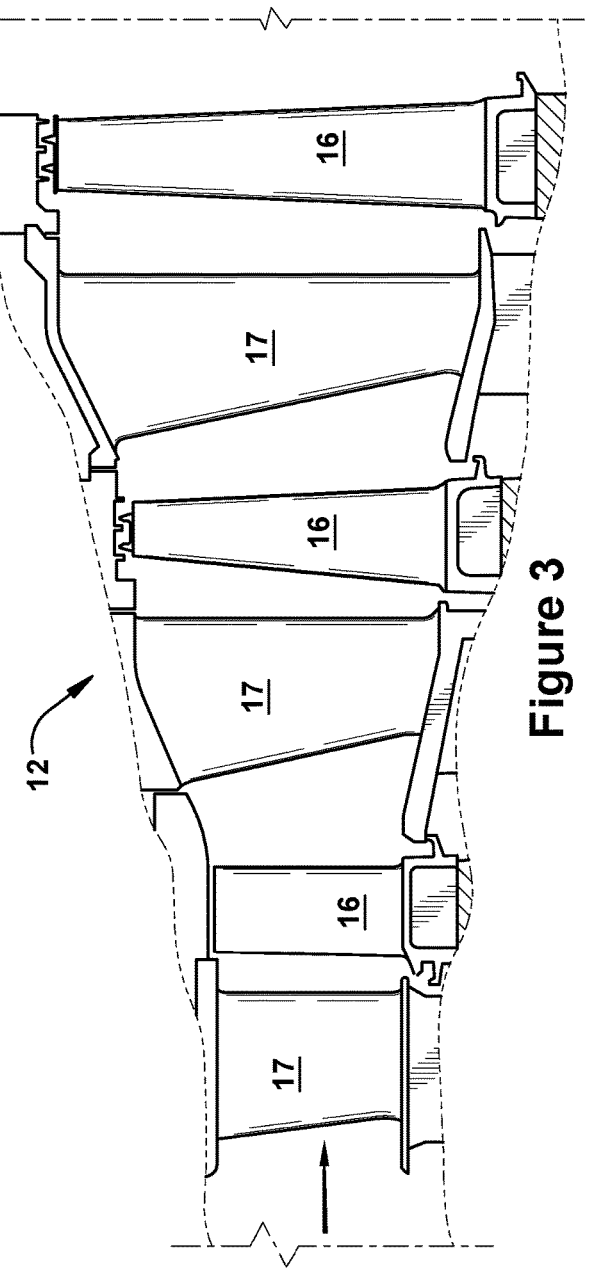
FIG. 3 is a sectional view of the turbine section of the gas turbine of FIG. 1.

By way of background, referring now with specificity to the figures, FIGS. 1 through 3 illustrate an exemplary gas turbine in accordance with the present invention or within which the present invention may be used. It will be understood by those skilled in the art that the present invention may not be limited to this type of usage. As stated, the present invention may be used in gas turbines, such as the engines used in power generation and airplanes, steam turbine engines, as well as other types of rotary engines as would be recognized by one of ordinary skill in the art. The examples provided, thus, are not meant to be limiting unless otherwise stated. FIG. 1 is a schematic representation of a gas turbine 10. In general, gas turbines operate by extracting energy from a pressurized flow of hot gas produced by the combustion of a fuel in a stream of compressed air. As illustrated in FIG. 1, gas turbine 10 may be configured with an axial compressor 11 that is mechanically coupled by a common shaft or rotor to a downstream turbine section or turbine 12, and a combustor 13 positioned between the compressor 11 and the turbine 12. As illustrated in FIG. 1, the gas turbine may be formed about a common central axis 19.

FIG. 2 illustrates a view of an exemplary multi-staged axial compressor 11 that may be used in the gas turbine of FIG. 1. As shown, the compressor 11 may have a plurality of stages, each of which include a row of compressor rotor blades 14 and a row of compressor stator blades 15. Thus, a first stage may include a row of compressor rotor blades 14, which rotate about a central shaft, followed by a row of compressor stator blades 15, which remain stationary during operation. FIG. 3 illustrates a partial view of an exemplary turbine section or turbine 12 that may be used in the gas turbine of FIG. 1. The turbine 12 also may include a plurality of stages. Three exemplary stages are illustrated, but more or less may be present. Each stage may include a plurality of turbine nozzles or stator blades 17, which remain stationary during operation, followed by a plurality of turbine buckets or rotor blades 16, which rotate about the shaft during operation. The turbine stator blades 17 generally are circumferentially spaced one from the other and fixed about the axis of rotation to an outer casing. The turbine rotor blades 16 may be mounted on a turbine wheel or rotor disc (not shown) for rotation about a central axis. It will be appreciated that the turbine stator blades 17 and turbine rotor blades 16 lie in the hot gas path or working fluid flowpath through the turbine 12. The direction of flow of the combustion gases or working fluid within the working fluid flowpath is indicated by the arrow.

In one example of operation for the gas turbine 10, the rotation of compressor rotor blades 14 within the axial compressor 11 may compress a flow of air. In the combustor 13, energy may be released when the compressed air is mixed with a fuel and ignited. The resulting flow of hot gases or working fluid from the combustor 13 is then directed over the turbine rotor blades 16, which induces the rotation of the turbine rotor blades 16 about the shaft. In this way, the energy of the flow of working fluid is transformed into the mechanical energy of the rotating blades and, given the connection between the rotor blades and the shaft, the rotating shaft. The mechanical energy of the shaft may then be used to drive the rotation of the compressor rotor blades 14, such that the necessary supply of compressed air is produced, and also, for example, a generator to produce electricity.

For background purposes, FIGS. 4 through 7 provide views of a turbine rotor blade 16 in accordance with or within which aspects of the present invention may be practiced. As will be appreciated, these figures are provided to illustrate common configurations of rotor blades so to delineate spatial relationships between components and regions within such blades for later reference while also describes geometric constraints and other criteria that affect the internal and external design thereof. While the blade of this example is a rotor blade, it will be appreciated that, unless otherwise stated, the present invention also may be applied to other types of blades within the gas turbine.

The rotor blade 16, as illustrated, may include a root 21 that is used for attaching to a rotor disc. The root 21, for example, may include a dovetail 22 configured for mounting in a corresponding dovetail slot in the perimeter of a rotor disc. The root 21 may further include a shank 23 that extends between the dovetail 22 and a platform 24. The platform 24, as shown, forms the junction of the root 21 and an airfoil 25, which is the active component of the rotor blade 16 that intercepts the flow of working fluid through the turbine 12 and induces rotation. The platform 24 may define the inboard end of the airfoil 25 and a section of the inboard boundary of the working fluid flowpath through the turbine 12.

The airfoil 25 of the rotor blade may include a concave pressure face 26 and a circumferentially or laterally opposite convex suction face 27. The pressure face 26 and suction face 27 may extend axially between opposite leading and trailing edges 28, 29, respectively. The pressure face 26 and suction face 27 also may extend in the radial direction from an inboard end, i.e., the platform 24, to an outboard tip 31 of the airfoil 25. The airfoil 25 may include a curved or contoured shape extending between the platform 24 and the outboard tip 31. As illustrated in FIGS. 4 and 5, the shape of the airfoil 25 may taper gradually as it extends between the platform 24 to the outboard tip 31. The tapering may include an axial tapering that narrows the distance between the leading edge 28 and the trailing edge 29 of the airfoil 25, as illustrated in FIG. 4, as well as a circumferential tapering that reduces the thickness of the airfoil 25 as defined between the suction face 26 and the pressure face 27, as illustrated in FIG. 5. As shown in FIGS. 6 and 7, the contoured shape of the airfoil 25 may further include a twisting about the longitudinal axis of the airfoil 25 as it extends from the platform 24. The twisting typically is configured so to vary a stagger angle for the airfoil 25 gradually between the inboard end and outboard tip 31.

For descriptive purposes, as shown in FIG. 4, the airfoil 25 of the rotor blade 16 may further be described as including a leading edge section or half and trailing edge section or half defined to each side of an axial midline 32. The axial midline 32, according to its usage herein, may be formed by connecting the midpoints 34 of the camber lines 35 of the airfoil 25 between the platform 24 and the outboard tip 31. Additionally, the airfoil 25 may be described as including two radially stacked sections defined inboard and outboard of a radial midline 33 of the airfoil 25. Thus, as used herein, an inboard section or half of the airfoil 25 extends between the platform 24 and the radial midline 33, while an outboard section or half extends between the radial midline 33 and the outboard tip 31. Finally, the airfoil 25 may be described as including a pressure face section half and a suction face section or half, which, as will be appreciated are defined to each side of the camber line 35 of the airfoil 25 and the corresponding face 26, 27 of the airfoil 25.

The rotor blade 16 may further include an internal cooling configuration 36 having one or more cooling channels 37 through which a coolant is circulated during operation. The cooling channels 37 may extend radially outward from a connection to a supply source formed through the root 21 of the rotor blade 16. The cooling channels 37 may be linear, curved or a combination thereof, and may include one or more outlet or surface ports through which coolant is exhausted from the rotor blade 16 and into the working fluid flowpath.

Figure 8:
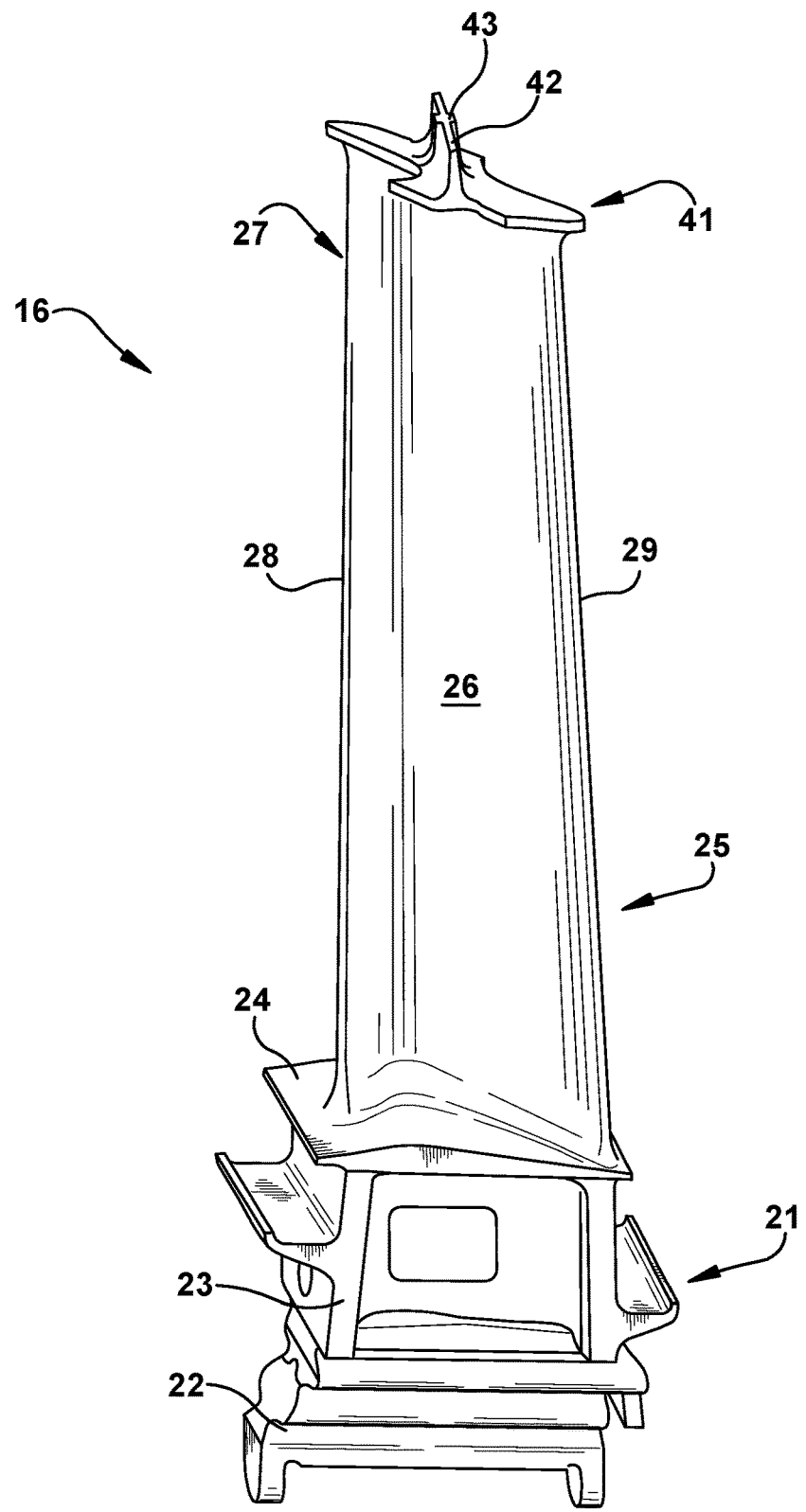
FIG. 8 is a perspective view of an exemplary turbine rotor blade that includes configuration according to possible aspects and embodiments of the present application.

FIG. 8 provides a perspective view of an exemplary turbine rotor blade 16 that includes a tip shroud 41. As shown, the tip shroud 41 may be positioned near or at the outboard end of the airfoil 25. The tip shroud 41 may include an axially and circumferentially extending flat plate or planar component, which is supported towards its center by the airfoil 25. For descriptive purposes, the tip shroud 41 may include an inboard surface 45, outboard surface 44, and edge 46. As illustrated, the inboard surface 45 opposes the outboard surface 44 across the narrow radial thickness of the tip shroud 41, while the edge 46 connects the inboard surface 45 to the outboard surface 44 and, as used herein, defines a peripheral profile or shape of the tip shroud 41.

A seal rail 42 may be positioned along the outboard surface 44 of the tip shroud 41. Generally, as illustrated, the seal rail 42 is a fin-like projection that extends radially outward from the outboard surface 44 of the tip shroud 41. The seal rail 42 may extend circumferentially between opposite ends of the tip shroud 41 in the direction of rotation or "rotation direction" of the rotor blade 16. As will be appreciated, the seal rail 42 may be used to deter leakage of working fluid through the radial gap that exists between the tip shroud 41 and the surrounding stationary components that define the outboard boundary of the working fluid flowpath through the turbine. In some conventional designs, the seal rail 42 may extend radially into an abradable stationary honeycomb shroud that opposes it across that gap. The seal rail 42 may extend across substantially the entire circumferential length of the outboard surface 44 of the tip shroud 41. As used herein, the circumferential length of the tip shroud 41 is the length of the tip shroud 41 in the rotation direction 50. A cutter tooth 43 may be disposed on the seal rail 42. As will be appreciated, the cutter tooth 43 may be provided for cutting a groove in the abradable coating or honeycomb of the stationary shroud that is slightly wider than the width of the seal rail 42. The tip shroud 41 may include fillet regions that are configured to provide smooth surficial transitions between the divergent surfaces of the tip shroud 41 and the airfoil 25, as well as those between the tip shroud 41 and the seal rail 42. (As will be appreciated, similar fillet regions may be included between the midspan shrouds discussed below and the airfoil 25.)

Figure 9:
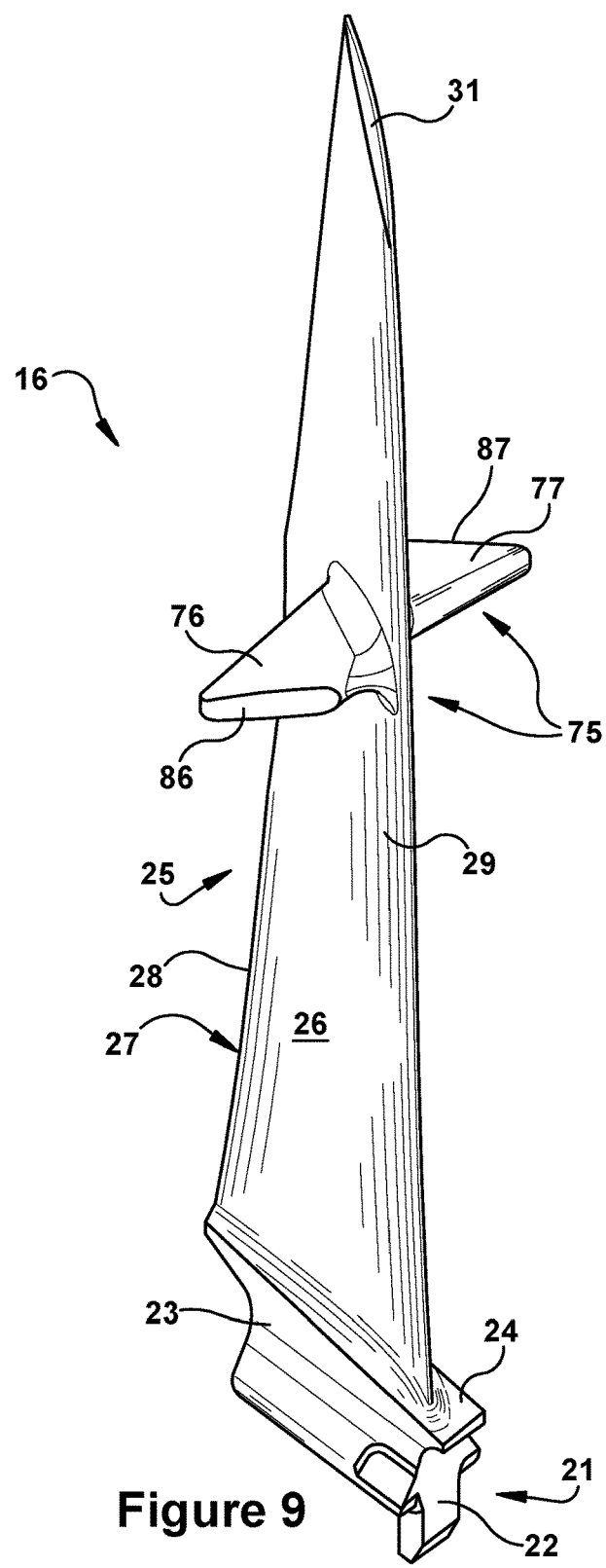
FIG. 9 is a perspective view of an exemplary rotor blade that includes a midspan shroud and configuration according to possible aspects and embodiments of the present application.
Figure 10:
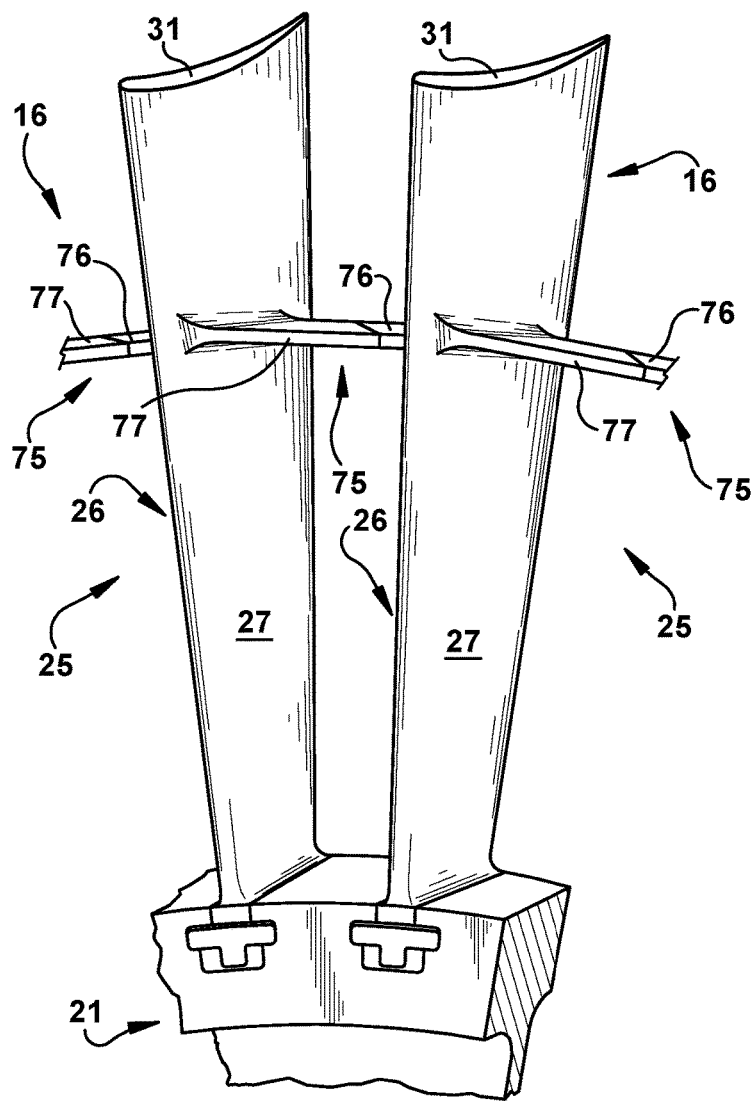
FIG. 10 is a perspective view of an exemplary installed arrangement of rotor blades with midspan shrouds in accordance with possible aspects and embodiments of the present application.
Figure 11:
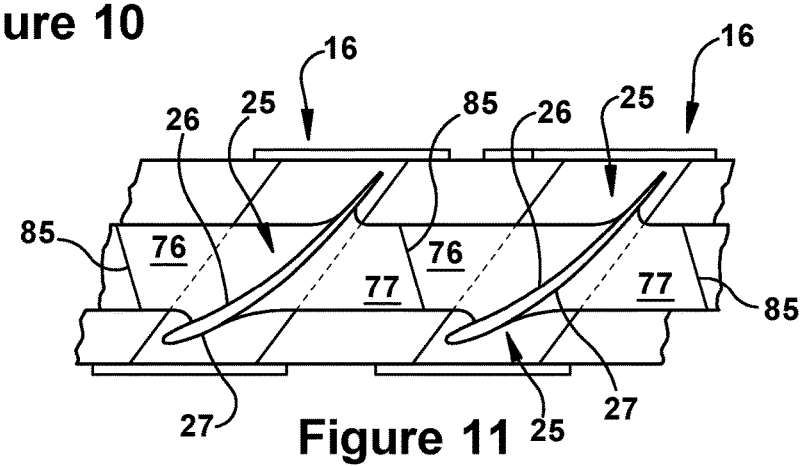
FIG. 11 is an outboard view of an exemplary installed arrangement of rotor blades with midspan shrouds in accordance with possible aspects and embodiments of the present application.

FIGS. 9 through 11 provide views of an exemplary turbine rotor blade having a midspan shroud in accordance with the present invention or within which aspects of the present invention may be practiced. FIG. 9 illustrates a perspective view of a rotor blade 16 in which the airfoil 25 includes an exemplary midspan shroud 75. As will be appreciated, the midspan shroud 75 shares certain features and attributes with the tip shroud 41 component just discussed. For example, like the tip shroud 41, the midspan shroud 75 may be configured to span between neighboring airfoils 25 within a row of installed rotor blades 16. As will be appreciated, though, unlike tip shrouds 41, midspan shrouds 75 are not positioned at or near the outboard tip 31 of the airfoil 25. Instead, as shown, midspan shrouds 75 coincide radially with the middle region of the airfoil 25. Accordingly, midspan shrouds 75 may be positioned near the radial midline 33 of the airfoil 25. According to another definition used herein, midspan shrouds 75 may be defined broadly as a shroud positioned inboard of an outboard tip 41 of the airfoil 25 and outboard of a platform 24. According to another definition used herein, a midspan shroud 75 also may be defined as one disposed within a radial range of the airfoil 25. Thus, according to certain embodiments, this radial range of may be defined as being between an inboard boundary of approximately 25% of the radial height of the airfoil 25 and an outboard boundary of approximately 85% of the radial height of the airfoil 25. According to other more specific embodiments, the range of positions of a midspan shroud 75 is defined as being between an inboard boundary of approximately 33% of the radial height of the airfoil 25 and an outboard boundary of approximately 66% of the radial height of the airfoil 25.

According to present configurations, the midspan shroud 75 may include wing-like projections extending from the sides of the airfoil 25. Each of these wing-like projections may be referred to according to the face 26, 27 of the airfoil 25 from which it extends. Thus, for descriptive purposes herein, the midspan shroud 75 is reference as including a pressure wing 76 that juts from the pressure face 26 of the airfoil 25, and a suction wing 77 that juts from the suction face 27 of the airfoil 25. As illustrated, each of the wings 76, 77 may be configured as an axially and circumferentially jutting component that is comparatively thin in the radial dimension compared to the radial height of the airfoil 25, thereby making them resemble "wings". Though this designation as "wings" is not intended to be limiting in ways not stated herein. As will be described in more detail below, each of the wings 76, 77 of the midspan shroud 75 may be configured to functionally cooperate with the opposite one of the wings 76, 77 of a similarly configured, neighboring rotor blade that is positioned next to it and within the same blade row. This functional cooperation may include both mechanical engagement as well as producing configurations improving the aerodynamic performance of the assembly.

FIG. 10 provides a perspective view of rotor blades 16 having midspan shrouds 75 as they might be arranged in an exemplary installed condition, while FIG. 11 provides a top view of the same assembly. As shown, the midspan shrouds 75 may be configured so to link or engage other midspan shrouds 75 of the rotor blades 16 that are adjacent to them. Thus, within the row of rotor blades 16, as illustrated, the pressure wing 76 that extends from the pressure face 26 of a first rotor blade 16 may be configured to cooperate with the suction wing 77 that extends from the suction face 27 of a second rotor blade 16 that resides to one side of the first rotor blade 16. Similarly, the suction wing 77 that extends from the suction face 27 of the first rotor blade 16 may be configured to cooperate with the pressure wing 76 that extends from the pressure face 26 of a third rotor blade 16 that resides to the other side of the first rotor blade 16. In this manner, the midspan shrouds 75 may be used to create a point of contact between the airfoils 25 of adjacent rotor blades 16 during operation. This point of contact may occur between a midspan shroud-to-shroud interface (hereinafter "interface 85"), across which a pressure wing contact face 86 and a suction wing contact face 87 may engage each other. This contact may be intermittent or constant and may depend upon an operating mode of the gas turbine. As will be appreciated, the linking of the airfoils 25 of rotor blades 16 in this manner may be done to increase the natural frequency of the assembly and dampen operational vibrations, which may reduce the overall mechanical stresses on the rotor blades 16 and prolong useful life.

Figure 12:
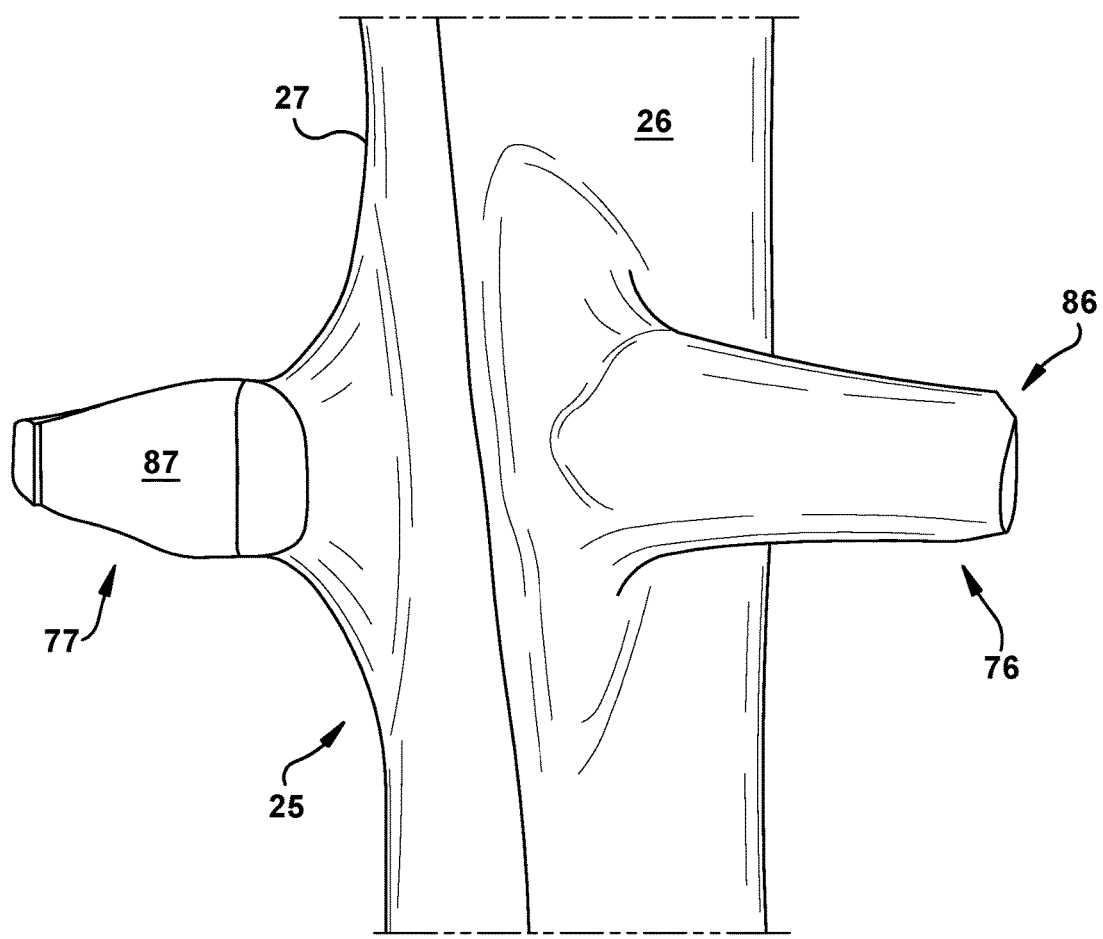
FIG. 12 is a perspective view of an airfoil having a midspan shroud in accordance with possible aspects and embodiments of the present application.
Figure 13:
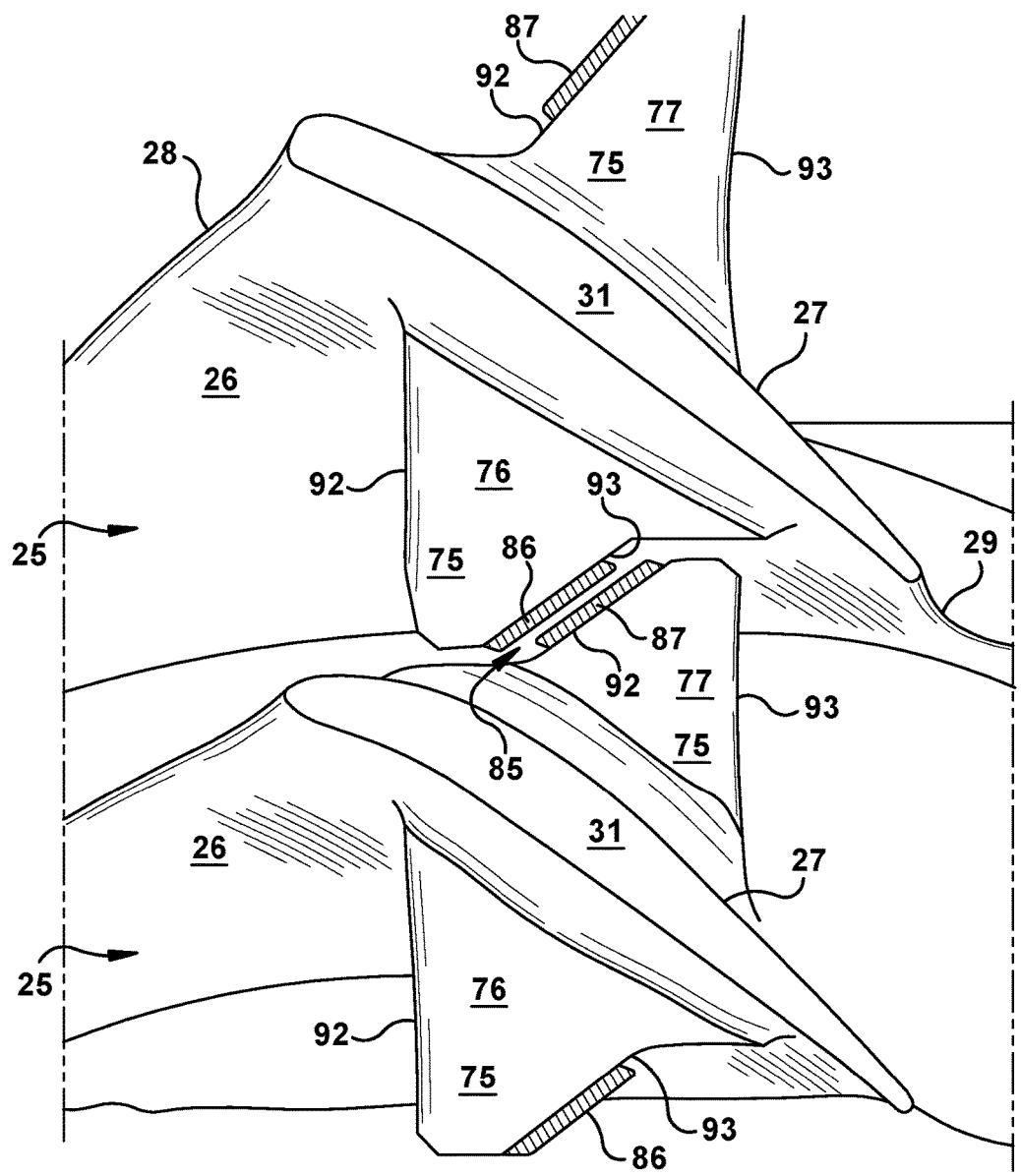
FIG. 13 is a perspective view of an exemplary installed arrangement of rotor blades with midspan shrouds that form an interface in accordance with possible aspects and embodiments of the present application.
Figure 14:
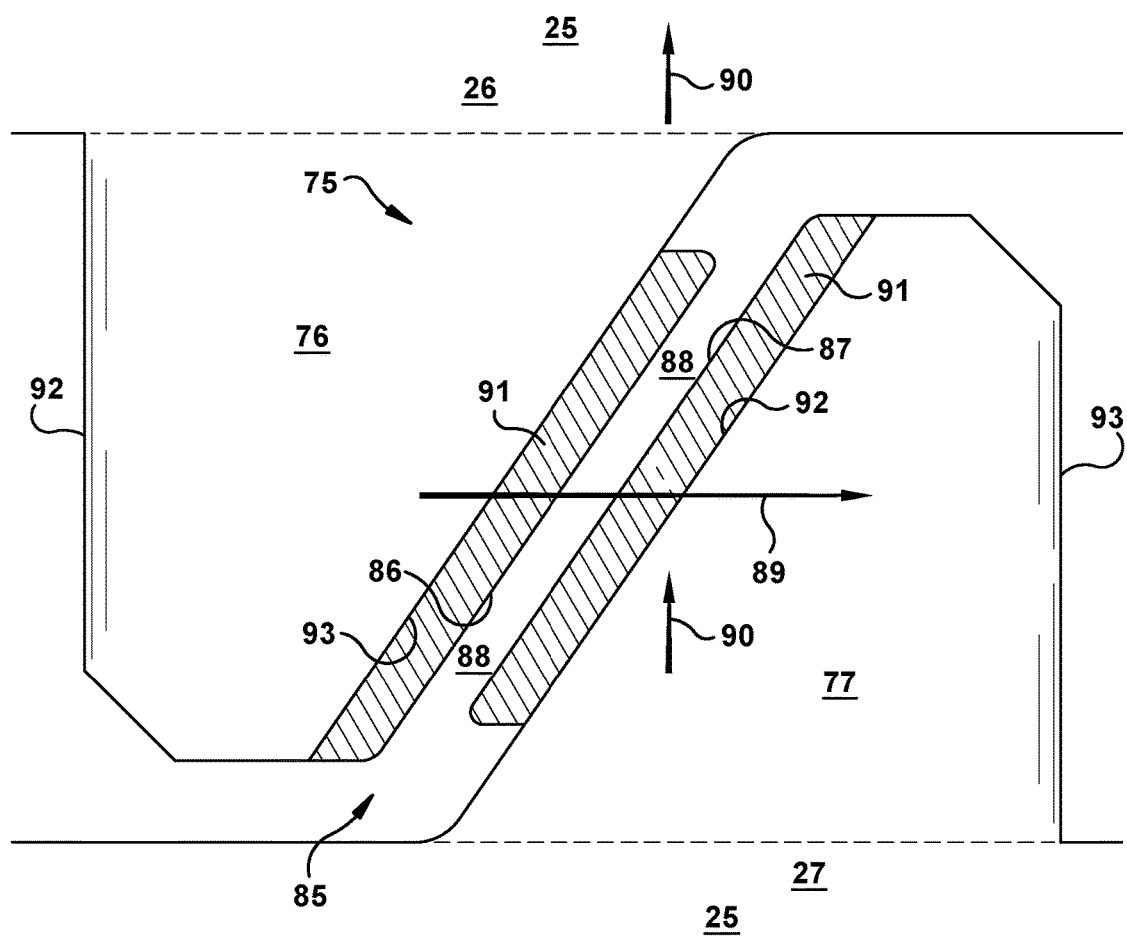
FIG. 14 is an outboard profile view of an exemplary installed arrangement of rotor blades with midspan shrouds that form an interface in accordance with possible aspects and embodiments of the present application.

With specific reference now to FIGS. 12 through 14, several configurations of rotor blades 16 having midspan shrouds are presented that are in accordance with certain aspects or the present invention and/or within which exemplary embodiments of the present invention may be used. As will be appreciated, these examples are described with reference to and in light of the components and related concepts already provided herein, particularly those discussed in relation to the preceding figures. As before, the midspan shroud 75 may include a pressure wing 76 extending from the pressure face 26 of the airfoil 25 and a suction wing 77 extending from the suction face 27 of the airfoil 25. The pressure wing 76 and suction wing 77 of the midspan shroud 75 may be configured so to cooperatively form an interface 85 between neighboring rotor blades of the same design once such blades are installed side by side on a rotor disc. As will be appreciated, the interface 85 may include a pressure wing contact face 86 disposed on the pressure wing 76 and a suction wing contact face 87 disposed on the suction wing 77. The interface 85 may include the contact faces 86, 87 opposing each other across a gap 88. Once the rotor blades are installed, the gap 88 of the interface 85 may vary in distance. That is to say, the gap 88, as shown in FIG. 14, may be wider in a cold-build or cold state, which is when the engine is not operating. In other conditions, for example when the engine is operating at capacity (i.e., a hot state), the gap 88, as is shown in FIG. 11, may substantially close so that the contact faces 86, 87 are brought together.

According to the present invention, in the cold state, the gap 88 may be wide and the relative alignment and position between the contact faces 86, 87 of the interface 85 may include a predetermined offset. As provided herein, this predetermined offset may be configured such that a desirable alignment between the contact faces 86, 87 is achieved when operating conditions close the gap 88. That is to say, the interface 85 includes a predetermined offset between the contact faces 86, 87 configured for desirably aligning the pressure wing contact face 86 against the suction wing contact face 87 when expected operating conditions result in closing the gap 88.

For descriptive purposes, a gas turbine includes a working fluid flowpath defined through a compressor positioned at a forward end and a turbine positioned at an aftward end. As will be appreciated, this orientation may be used to define a forward direction and an aftward direction within the gas turbine and its component sections. Further, as used herein, the term "flow direction" (as indicated by arrow 89) refers to the general direction of working fluid flow through the working fluid flowpath given normal operation. Within the compressor and turbine sections, thus, the term flow direction may be understood as being an idealized reference direction, which is defined as being parallel to the central axis of the gas turbine and oriented in the aftward direction. As mentioned, the term "rotation direction" (as indicated by arrow 90) refers to an expected direction of rotation for rotor blades during normal operating conditions within the compressor or turbine sections of the engine. Finally, unless otherwise stated, it should be understood that the present invention may be used in conjunction with rotor blades configured for use in the compressor or turbine sections of a gas turbine. As illustrated, one preferred embodiment includes use in conjunction with rotor blades configured specifically for the turbine section of the engine.

Given the above definitions, it will be appreciated that the pressure wing 76 and suction wing 77 each may be described as including a forward face 92 and an aftward face 93. As illustrated, the forward face 92 of each faces toward the forward end of the gas turbine (or in the upstream direction) and the aftward face 93 of each faces toward the aftward end of the gas turbine (or in the downstream direction). As illustrated, the interface 85 may be formed between circumferentially overlapping sections of the pressure wing 76 and the suction wing 77. Within this circumferential overlap, according to a preferred embodiment, the pressure wing 76 is positioned forward of the suction wing 77. As will be appreciated, in such cases, the pressure wing contact face 86 is formed on the aftward face 93 of the pressure wing 76, and the suction wing contact face 87 is formed on the forward face 92 of the suction wing 77.

Accordingly, as illustrated in FIGS. 13 and 14, the pressure wing contact face 86 may be configured as a non-integral pad 91 that is affixed to the aftward face 93 of the pressure wing 76. In similar fashion, the suction wing contact face 87 also may be configured as a non-integral pad 91 that is affixed to the forward face 92 of the suction wing 77. The aftward face 93 of the pressure wing 76 to which the non-integral pad 91 is affixed may be configured as a substantially flat surface. The forward face 92 of the suction wing 77 to which the non-integral pad 91 is affixed also may be configured as a substantially flat surface. In such cases, the non-integral pads 91, thus, may form a raised contact surface relative the surrounding surfaces to which each attaches. Thought other configurations are possible, the non-integral pad 91 of the aftward face 93 of the pressure wing 76 may include a constant thickness such that, upon being affixed thereto, the pressure wing contact face 86 is formed as a substantially flat surface. Likewise, the non-integral pad 91 of the forward face 92 of the suction wing 77 may include a constant thickness such that, upon being affixed thereto, the suction wing contact face 87 is formed as a substantially flat surface.

With general reference now to FIGS. 15 through 19, several midspan shroud configurations and methods of manufacture related thereto are presented which are in accordance with exemplary embodiments of the present invention. As will be appreciated, these examples are described with reference to and in light of the systems and related concepts already provided herein, particularly those discussed in relation to the preceding figures.

The present invention may include midspan shrouds having chambered configurations in which hollow pockets or chambers are formed to reduce the weight of the midspan shroud while still maintaining structural performance and robustness. These chambers may be enclosed via preformed coverplates that are brazed or welded into place. Alternatively, the chambers may remain open. According to exemplary embodiments, such chambers may be strategically positioned so to reduce operation stresses applied to the midspan fillet region, contact faces, and airfoil, without reducing the overall stiffness and structural performance through the affected regions and rotor blade generally. As described below, the hollow chambers may be formed via conventional machining processes, including electro-chemical, chemical or mechanical processes. According to certain preferred embodiments, the hollow chambers may be formed through any one of several midspan shroud surfaces, which are described with particularity herein. These include the contact faces of the midspan shroud as well as circumstantial faces, which, as will be described, may be formed at the outer or distal end of the pressure and suction wings of the midspan shroud.

More specifically, the present invention may involve the hollowing or coring out of particular midspan internal regions so to remove dead mass. Present configurations may do this to reduce the overall weight of the rotor blade, while leaving intact other more structurally significant areas, such as those within the midspan shroud fillet regions or certain areas within the airfoil. For example, according to present configurations, the midspan shroud may include a hollow chamber located adjacent to and enclosed by the wear pads of the midspan shroud contact faces. This hollowed portion may be optimally limited to areas near the contact face so that it does not structurally impact the performance of the forward face of the midspan shroud. That is to say, the present invention may optimize the location of the hollowed portions by identifying regions bearing relatively minimal bending load. According to other exemplary embodiments, such "dead mass" regions may be found just outside of and in spaced relation to a particular bending plane that forms within midspan shrouds having a particular configuration. As described below, this bending plane maybe defined relative to a particular type of "V-notch" edge profile that may be found on certain midspan shroud configurations. In this manner, bending stiffness may be maintained, while mass removed and stress levels reduced.

As will be appreciated, weight reduction that maintains structural integrity may enable significant performance benefits. The weight reduction, for example, may simply reduce overall pull forces acting on the rotor blade during operation, and, thereby, extend creep life, particularly, at certain life-limiting locations on the airfoil. Analysis of present configurations show creep life improvements to such critical areas by as much as 40%. Alternatively, the reduction in weight may be offset by increasing the overall size of the midspan shroud. This, for example, may enable increasing the size of the contact faces and, thereby, reduce stress concentrations occurring between such contact faces during operation. Further, configurations of the present invention may allow for the reduction of fillet size in the midspan shrouds, which may boost overall aerodynamic performance. Additionally, as provided below, the present invention may enable efficient construction methods. That is to say, many of the features described herein may be constructed via cost-effective and efficient processes, which will be described in more detail below. For example, the present methods may enable the retrofit of existing rotor blades with modified, life-extending midspan shrouds using highly efficient machining processes.

Referring now specifically to FIGS. 15 through 18, the midspan shroud 75 may include a pressure wing 76 extending from the pressure face 26 of the airfoil 25 and a suction wing 77 extending from the suction face 27 of the airfoil 25. As before, the pressure wing 76 and the suction wing 77 may be configured so to cooperatively form an interface 85 between installed neighboring rotor blades within a row of samely configured rotor blades (i.e., rotor blades having the same configuration).

According to embodiments of the present invention, at least one of the pressure wing 76 and the suction wing 77 may include one or more chambers 98 hollowed through one or more predetermined surface regions. As further defined below, the predetermined surface region may include: a circumferential face 106, 107 (which, as used herein, is a surface area or face formed at an outer or distal end of each of the wings); or one of the contact faces 86, 87. According to other exemplary embodiments, both of the pressure wing 76 and the suction wing 77 may include one or more of the chambers 98 hollowed through one or more of these predetermined surfaces.

More specifically, the distal end of the pressure wing 76 and/or suction wing 77 may be configured to include a circumferentially facing surface or face, which will be referred to herein as the circumferential face 106, 107 of each. The circumferential face of the pressure wing 76 is designated herein as a "pressure wing circumferential face 106", while the circumferential face of the suction wing 77 is designated herein as a "suction wing circumferential face 107". As indicated, the pressure wing circumferential face 106 spans between the forward face 92 and the aftward face 93 of the pressure wing 76. As illustrated, the pressure wing circumferential face 106 may be configured as a planar surface that faces opposite of the rotation direction 90. The suction wing circumferential face 107 spans between the forward face 92 and the aftward face 93 of the suction wing 77. As illustrated, the suction wing circumferential face 107 may include a planar surface that faces toward the rotation direction 90. Further, as described above, the pressure wing 76 and the suction wing 77 each may include a contact face. As already defined above, the contact face of the pressure wing 76 may be designated as a pressure wing contact face 86, while the contact face of the suction wing 77 may be designated as a suction wing contact face 87.

Figure 15:
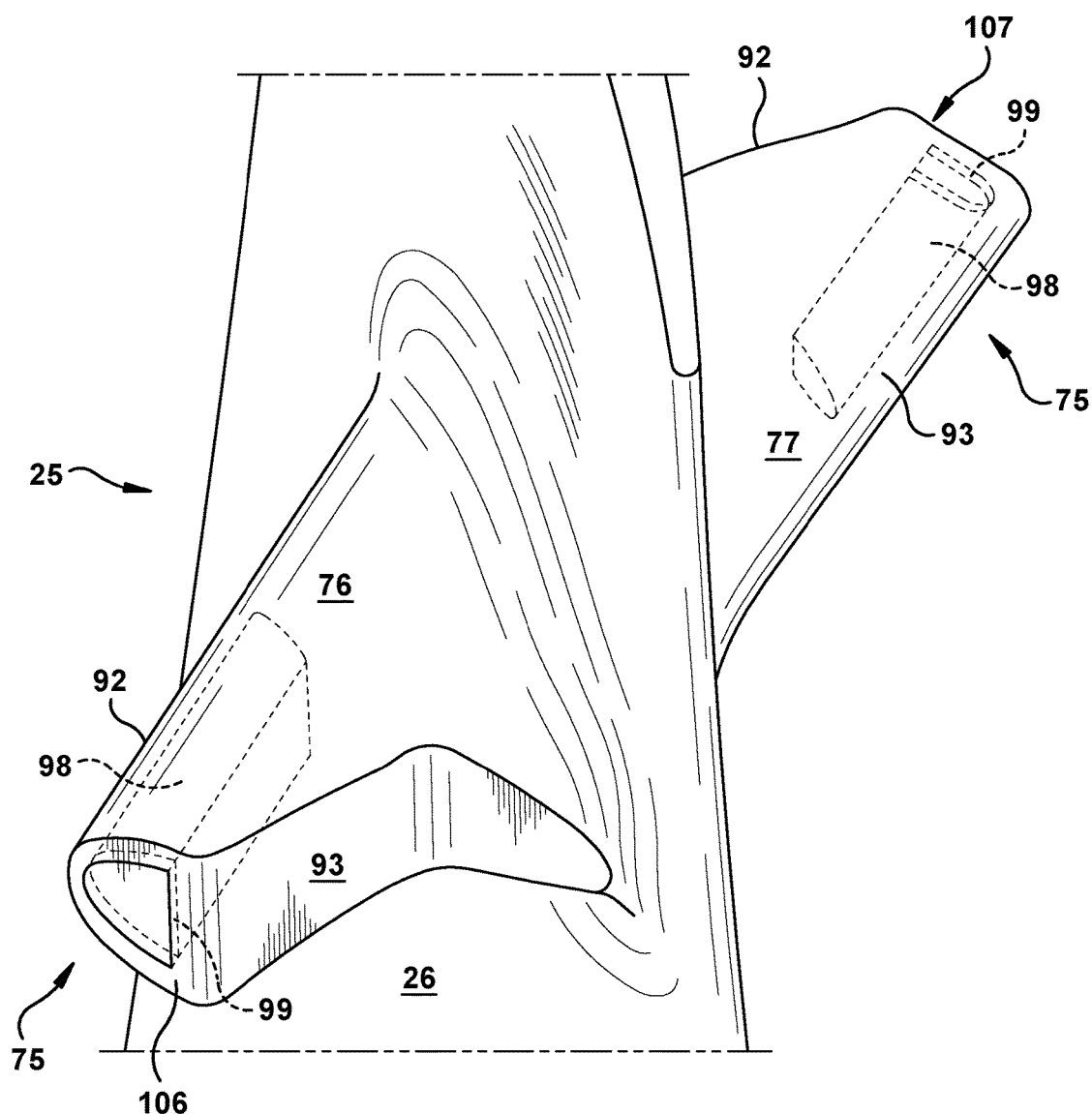
FIG. 15 is a perspective view of an exemplary rotor blade with midspan shroud in accordance with possible aspects and embodiments of the present application.
Figure 16:
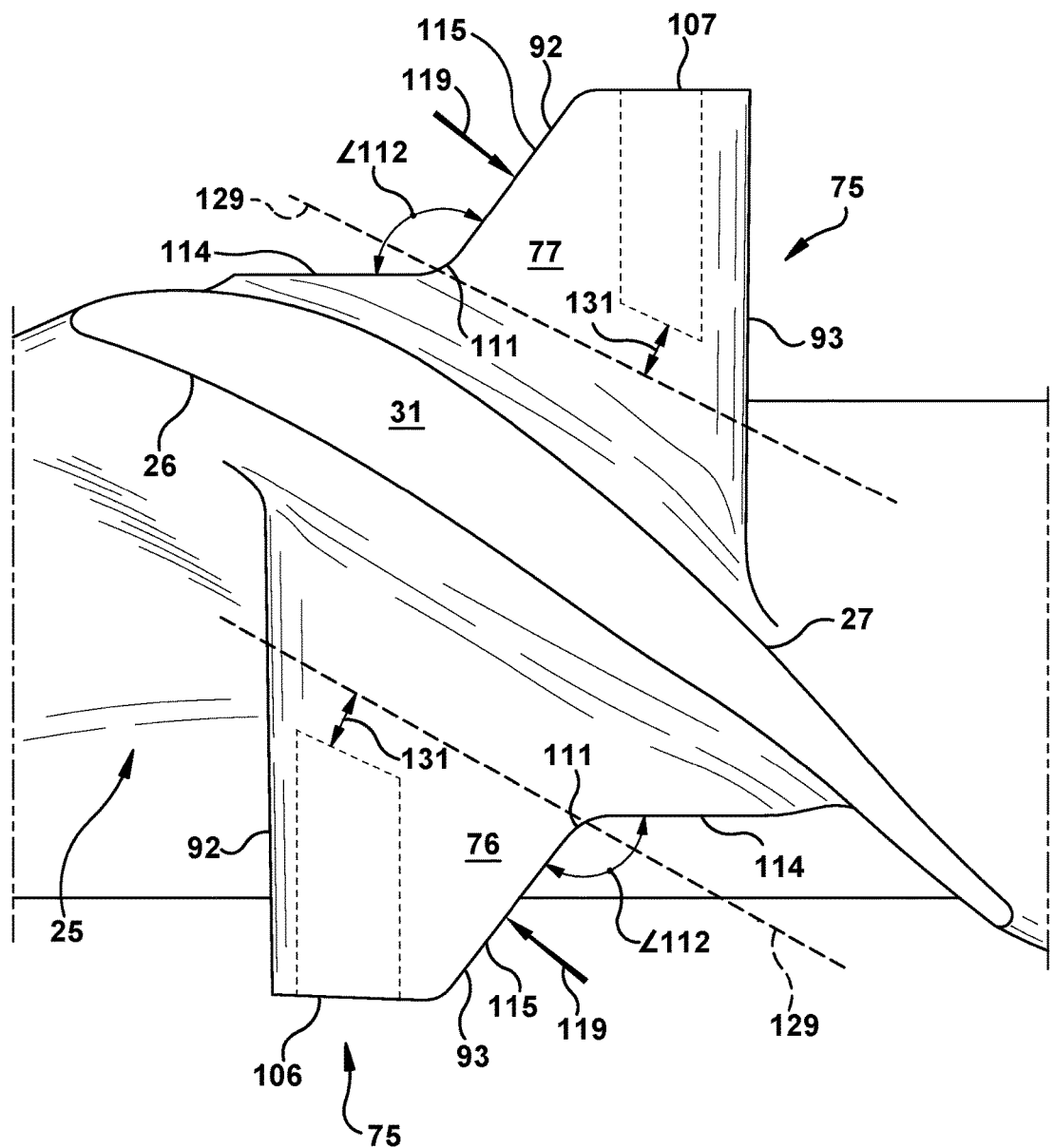
FIG. 16 is an outboard profile of the rotor blade of FIG. 15.

According to certain exemplary embodiments, one or more of the chamber 98 may be bored through the circumferential faces 106, 107 and included within the pressure wing 76 and/or suction wing 77. As illustrated in FIGS. 15 and 16, present configurations may include a chambers 98 formed in each of the pressure wing 76 and the suction wing 77. The chamber 98 of the pressure wing 76 may be hollowed through the pressure wing circumferential face 106. The chamber 98 of the suction wing 77 may be hollowed through the suction wing circumferential face 107. In such cases, as shown in FIG. 15, the pressure wing 76 may include a non-integral coverplate 99 affixed thereto for enclosing the chamber 98. Similarly, the suction wing 77 may include a non-integral coverplate 99 affixed thereto for enclosing the chamber 98. Each of the coverplates 99 may be configured for covering the opening or mouth of the chamber 98 formed through the surface of the shroud wing during the hollowing out or formation process. The coverplate 99 may be affixed via conventional methods, such as welding, brazing, or mechanical fit. As will be appreciated, the coverplate may be arranged and attached so that the surface of the pressure wing 76 remains continuous, smooth and aerodynamic. According to alternative embodiments, as shown in FIG. 16, the chambers 98 of the pressure wing 76 and the chamber 98 of the suction wing 77 may remain open, i.e., the mouth is not enclosed after formation of the chamber 98 such that the chamber 98 fluidly communicates with the working fluid flowpath.

Figure 17:
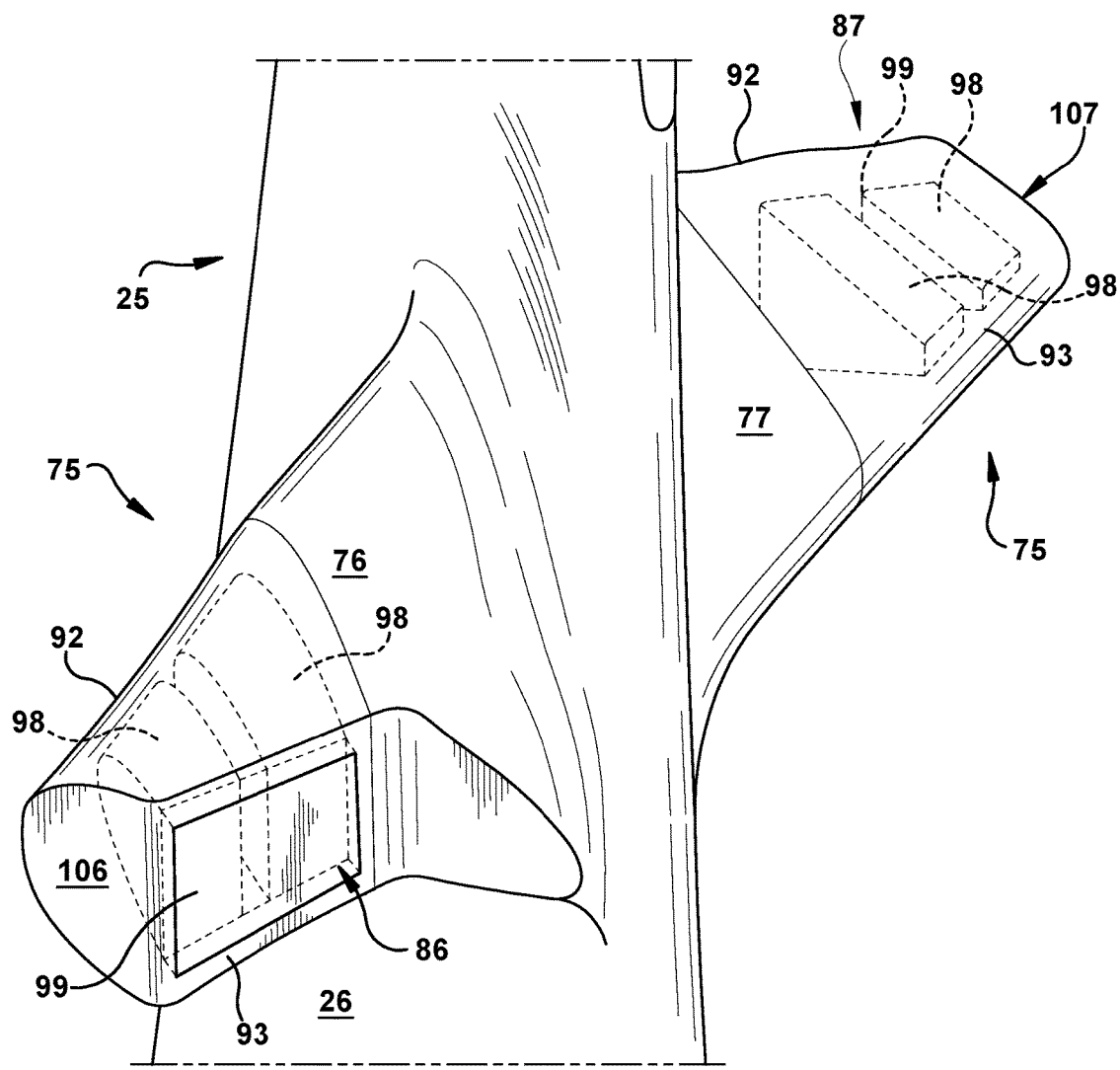
FIG. 17 is a perspective view of an exemplary rotor blade with midspan shroud in accordance with embodiments of the present invention.
Figure 18:
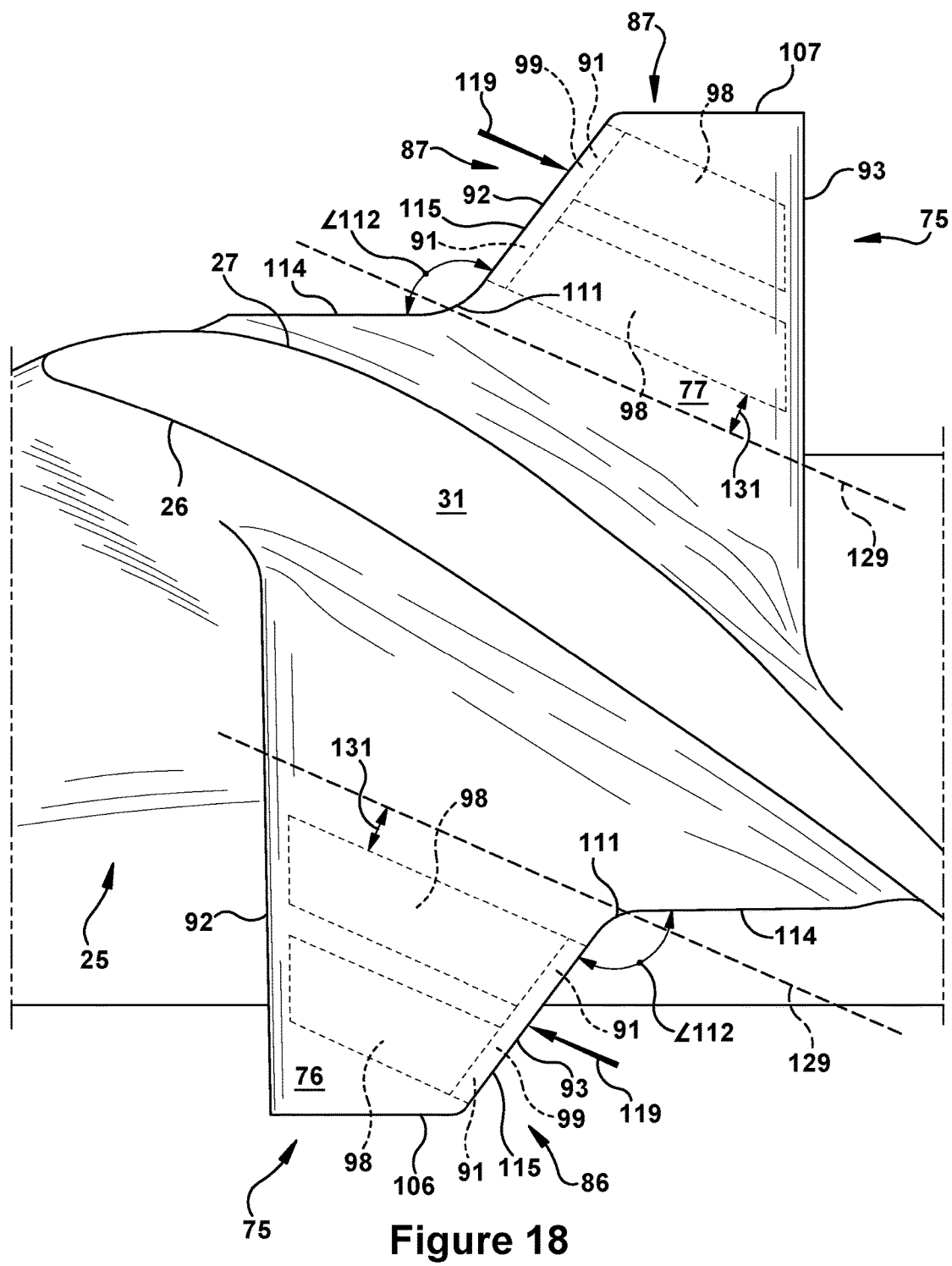
FIG. 18 is an outboard profile of the rotor blade of FIG. 17.

According to alternative embodiments, as illustrated in FIGS. 17 and 18, one or more of the chambers 98 may be hollowed into the contact faces 86, 87 of the pressure wing 76 and/or the suction wing 77, respectively. More specifically, according to an exemplary embodiment, dual chambers 98 may be formed through the pressure wing contact face 86 (which, as already stated, may be disposed on the aftward face 93 of the pressure wing 76). As further illustrated, the exemplary embodiment may include dual chambers 98 hollowed into the suction wing contact face 87 (which, as already stated, may be disposed on the forward face 92 of the suction wing 77). According to preferred embodiments, in such cases, the pressure wing 76 may include a non-integral coverplate 99 affixed to the pressure wing contact face 86 for enclosing the chambers 98 formed therethrough. Similarly, the suction wing 77 may include a non-integral coverplate 99 affixed to the suction wing contact face 87 for enclosing the chambers 98 formed therethrough. In either case, the coverplate 99 may be configured as a contact wear pad and function in that capacity.

With reference to the outboard profile of the wings 76, 77 as illustrated in FIGS. 16 and 18, the wings 76, 77 may be configured such that the aftward face 93 of the pressure wing 76 and the forward face 92 of the suction wing 77 each include a notched profile resembling a "V", which will hereinafter be referred to as a "V-notch" configuration. In regard to the aftward face 93 of the pressure wing 76, the V-notch configuration, as illustrated per the outboard profile, may include two approximately linear edges or segments that define the aftward face. These linear edges may be canted relative to each other and, thus, may be described as connecting at a connecting point 111 and forming an angle 112 therebetween. The angle 112 formed at the connecting point 111 may be between approximately 90° and 160°, though other configurations are also possible. As further illustrated, relative to the distance that each of the linear edges resides from the airfoil 25, the linear edges of the aftward face 93 of the pressure wing 76 may be designated a near edge 114 and a far edge 115. As will be appreciated, given this designation, the far edge 115 is the one that includes the pressure wing contact face 86. Similarly, still referencing the outboard profiles, the forward face 92 of the suction wing 77 may include the V-notch configuration. In this case, the V-notch configuration includes two approximately linear edge segments of the forward face 92 connecting at a connecting point 111 so to form an angle 112 therebetween. The angle 112 formed at the connecting point 111, as before, may be between approximately 90 and 160. As illustrated, relative to the distance that each of the linear edge segments resides from the airfoil 25, the linear edge segments of the forward face 92 of the suction wing 77 may be designated a near edge 114 and a far edge 115. As will be appreciated, the far edge 115 is the one that includes the suction wing contact face 87.

Given these designations and assuming a reference force (as indicated by arrows 119 in FIGS. 16 and 18) exerted perpendicularly against the contact faces 86, 87 (as may occur across interface 85 during operation), reference bending planes 129 for the pressure wing 76 and suction wing 77 that intersects the corresponding connecting points 111 may be defined. According to preferred embodiments, the location and shape of the one or more chambers 98 within the pressure wing 76 and/or suction wing 77 may be configured relative to the location and orientation of the corresponding reference bending plane 129. More specifically, the one or more chambers 98 of the pressure wing 76 may be offset (as indicated by offset distance 131) from the reference bending plane 129 of the pressure wing 76. As illustrated, the offset 131 is such so that the one or more chamber 98 reside on the outer portion of the pressure wing 76, i.e., the offset from the bending plane 129 is toward the distal end or circumferential face 107 of the pressure wing 76. Similarly, the one or more chambers 98 of the suction wing 77 may be offset (as indicated by offset distance 131) from the reference bending plane 129 of the suction wing 77. As illustrated, the offset 131 is such so that the one or more chambers 98 reside on the outer portion of the suction wing 77, i.e., the offset from the bending plane 129 is toward the distal end or circumferential face 107 of the suction wing 76. Additionally, as illustrated, the one or more chambers 98 of either of the pressure wing 76 or the suction wing 77 may be formed having an axis parallel to the bending plane 129. In such cases, for example, the edge of the chamber 98 nearest to the bending plane 129 may be parallel to (and offset therefrom by the offset distance 131) the bending plane 129. According to other embodiments, the same illustrated bending planes 129 may represent the anticipated bending plane according to centrifugal forces acting on the wings 76, 77 during operation. As will be appreciated, such centrifugal forces may concentrate stress in the bending plane region of the wings 76, 77 occurring just outside of a fillet region connecting the underside or inboard surface of the wings 76, 77 and the airfoil 25 surface from which each extends.

Figure 19:
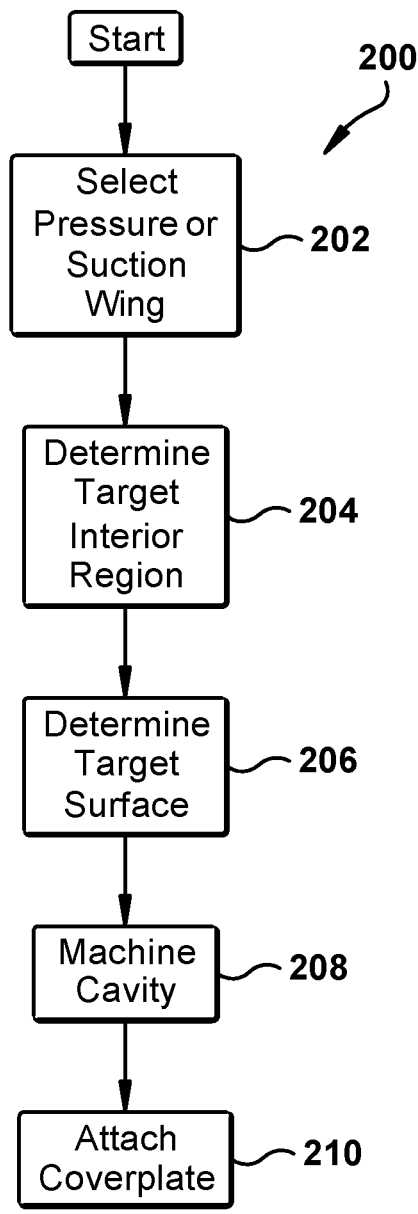
FIG. 19 is a method of manufacture according to an embodiment of the present invention.

With specific reference now to FIG. 19, the present invention may include methods for manufacturing midspan shrouded rotor blades that include the configurations discussed above. Among other aspects, the present invention describes the use of straightforward and cost-effective machining processes for significantly improving the performance of rotor blades via the manufacture of chambered configurations. As will be appreciated, the methods of manufacture enable use with both new rotor blades and retrofit applications.

As illustrated, an exemplary method 200 may generally include the steps of: selecting at least one of the pressure wing and the suction wing as a first wing (step 202); selecting, pursuant to a minimal bending load criteria, a target internal region within the selected first wing for hollowing to form one or more of the chambers (step 204); selecting a target surface on the selected first wing through which to form the one or more chambers, the target surface including either the circumferential face formed at a distal end of the first wing or the contact face (step 206); and, finally, forming the one or more chambers via a machining process through the target surface (step 208). According to an alternative embodiment, as will be appreciated, each of the pressure wing and the suction wing may be selected such that one or more chambers are formed in each per repetition of the preceding steps. The method 200 may also include the step of affixing a coverplate 99 to the target surface of the first wing to enclose the one or more chambers formed therethrough (step 210). Further, as discussed above, the step of selecting the target internal region may include the steps of: a) determining a bending plane within the first wing given a reference force directed perpendicularly against the contact surface of the first wing; and b) selecting, as the target internal region, an internal region offset from the bending plane (where the offset is toward the corresponding circumferential face). It will be appreciated that further steps may apparent to one of ordinary skill in the art given the teachings disclosed above—particularly those of the FIGS. 15 through 18 related to the characteristics of the chamber—as may be provided in the appended claims.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the present application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

That which is claimed:

1. A rotor blade for a gas turbine, the rotor blade being configured for use within a row of samely configured rotor blades attached to and circumferentially spaced about a rotor disc, the rotor blade further including:
   an airfoil defined between a concave pressure face and a laterally opposed convex suction face, wherein the pressure face and the suction face extend axially between opposite leading and trailing edges and radially between an outboard tip and an inboard end, the inboard end of the airfoil attaching to a root configured for connecting the rotor blade to the rotor disc; and
   a midspan shroud comprising a pressure wing extending from the pressure face of the airfoil and a suction wing extending from the suction face of the airfoil;
   wherein the pressure wing and the suction wing of the midspan shroud are configured so to cooperatively form an interface between installed neighboring ones of the rotor blades within the row of samely configured rotor blades, wherein the interface is formed between circumferentially and radially overlapping sections of the pressure wing and the suction wing, within which the pressure wing comprises a forward position relative to the suction wing;
   wherein each of the pressure wing and the suction wing comprises a forward face facing toward the forward direction and an aftward face facing toward the aftward direction;
   wherein a pressure wing circumferential face is a circumferential face positioned at a distal end of the pressure wing, and a suction wing circumferential face is a circumferential face positioned at a distal end of the suction wing;
   wherein the pressure wing circumferential face:
     spans between the forward face and the aftward face of the pressure wing; and
     comprises a planar surface that faces opposite of the rotation direction;
   wherein the suction wing circumferential face:
     spans between the forward face and the aftward face of the suction wing; and
     comprises a planar surface that faces toward the rotation direction;
   wherein each of the pressure wing and the suction wing comprise a chamber hollowed through a surface, and wherein:
     the surface through which the chamber of the pressure wing is hollowed comprises the pressure wing circumferential face; and
     the surface through which the chamber of the suction wing is hollowed comprises the suction wing circumferential face.

2. The rotor blade according to claim 1, wherein the rotor blade is describable according to orientation characteristics of the gas turbine; and
   wherein the orientation characteristics of the gas turbine include:
     relative radial, axial, and circumferential positioning defined pursuant to a central axis of the gas turbine that extends through one or both of a compressor and a turbine;
     a forward direction and an aftward direction defined relative to a forward end of the gas turbine that comprises the compressor and an aftward end of the gas turbine that comprises the turbine;
     a flow direction defined relative to an expected direction of flow of a working fluid through a working fluid flowpath defined through the compressor and the turbine, the flow direction comprising a reference line that is parallel to the central axis of the gas turbine and aimed in the aftward direction; and
     a rotation direction defined relative to an expected direction of rotation of the rotor blade during operation of the gas turbine.

3. The rotor blade according to claim 2,
   wherein an outboard profile of the interface comprises a profile of the interface as viewed from an outer radial perspective;

wherein the rotor blade comprises one configured for use in the turbine; and wherein the midspan shroud comprises a shroud that is disposed within a range of positions on the airfoil, the range of positions defined between an inboard boundary at 25% of a radial height of the airfoil and an outboard boundary at 85% of the radial height of the airfoil.

4. The rotor blade according to claim 3, wherein:
the contact face of the pressure wing is designated as a pressure wing contact face; and
the contact face suction wing is designated as a suction wing contact face.

5. The rotor blade according to claim 3, wherein:
the pressure wing comprises a non-integral coverplate affixed thereto for enclosing the chamber of the pressure wing; and
the suction wing comprises a non-integral coverplate affixed thereto for enclosing the chamber of the suction wing.

6. The rotor blade according to claim 3, wherein, at the circumferential face:
the chamber of the pressure wing comprises a mouth that opens to the working fluid flowpath; and
the chamber of the suction wing comprises a mouth that opens to the working fluid flowpath.

7. A method of manufacturing a rotor blade for use in a turbine of a gas turbine, wherein the rotor blade includes: an airfoil defined between a concave pressure face and a laterally opposed convex suction face; and a midspan shroud comprising a pressure wing extending from the pressure face of the airfoil and a suction wing extending from the suction face of the airfoil; the method comprising the steps of:
selecting a target internal region within each of the pressure wing and the suction wing for removal to form a hollow chamber, the target internal region selected pursuant to a minimal bending load criteria;
selecting a target surface on each of the pressure wing and the suction wing through which to form the chamber; and
forming the chamber via a machining process through the target surface;
wherein:
the pressure wing comprises a forward face and an aftward face designated relative to a direction each faces once installed into the turbine, wherein the aftward face comprises the contact face of the pressure wing;
the suction wing comprises a forward face and an aftward face designated relative to a direction each faces once installed in the turbine, wherein the forward face comprises the contact face of the suction wing;
a circumferential face of the pressure wing spans between the forward face and the aftward face of the pressure wing and comprises a planar surface that faces opposite of a rotation direction of the turbine once installed in the turbine; and
a circumferential face of the suction wing spans between the forward face and the aftward face of the suction wing and comprises a planar surface that faces toward the rotation direction of the turbine once installed in the turbine;
wherein the target surface for the pressure wing comprises the circumferential face of the pressure wing, and the target surface for the suction wing comprises the circumferential face of the suction wing.

* * * * *